United States Patent
Zangl et al.

(10) Patent No.: US 10,682,617 B2
(45) Date of Patent: Jun. 16, 2020

(54) STIRRER FOR A STIRRER VESSEL

(71) Applicant: Zeta Biopharma GmbH, Lieboch (AT)

(72) Inventors: Nicole Zangl, Kapfenberg (AT); Erwin Trummer, St. Stefan im Rosental (AT); Karl Münzer, Köflach (AT)

(73) Assignee: Zeta Biopharma GmbH, Lieboch (AT)

( * ) Notice: Subject to any disclaimer, the term of this patent is extended or adjusted under 35 U.S.C. 154(b) by 90 days.

(21) Appl. No.: 15/876,721

(22) Filed: Jan. 22, 2018

(65) Prior Publication Data

US 2018/0207593 A1 Jul. 26, 2018

(30) Foreign Application Priority Data

Jan. 25, 2017 (AT) .............................. A 50053/2017

(51) Int. Cl.
| | | |
|---|---|---|
| *B01F 13/08* | (2006.01) | |
| *B01F 7/16* | (2006.01) | |
| *B01F 7/00* | (2006.01) | |
| *F16C 17/10* | (2006.01) | |
| *F16C 33/04* | (2006.01) | |

(52) U.S. Cl.
CPC ...... *B01F 13/0845* (2013.01); *B01F 7/00641* (2013.01); *B01F 7/162* (2013.01); *B01F 13/0872* (2013.01); *F16C 17/10* (2013.01); *F16C 33/043* (2013.01)

(58) Field of Classification Search
CPC .............. B01F 13/0845; B01F 13/0872; B01F 7/00641; B01F 7/162; F16C 17/10; F16C 33/043
See application file for complete search history.

(56) References Cited

U.S. PATENT DOCUMENTS

| | | | | | |
|---|---|---|---|---|---|
| 4,209,259 | A | * | 6/1980 | Rains .................. | B01F 13/0827 366/273 |
| 4,384,788 | A | * | 5/1983 | Lenart ............... | B01F 15/00688 366/314 |
| 4,993,841 | A | * | 2/1991 | Lofgren ............. | B01F 13/0827 366/274 |
| 5,358,332 | A | * | 10/1994 | Derksen ................. | B01F 7/162 366/286 |
| 5,393,142 | A | * | 2/1995 | Meier ................. | B01F 13/0827 366/274 |
| 5,407,272 | A | * | 4/1995 | Meier ................. | B01F 13/0827 366/274 |

(Continued)

FOREIGN PATENT DOCUMENTS

EP 1 748 201 B1 12/2010

*Primary Examiner* — Tony G Soohoo
(74) *Attorney, Agent, or Firm* — Merchant & Gould P.C.

(57) ABSTRACT

A stirrer (2) for a stirrer vessel (20), which stirrer (2) comprises a stirrer head (1), a drive unit (4) and a magnetic coupling (3), wherein the magnetic coupling (3) has drive magnets (5) connected to the drive unit (4) and stirrer head magnets (6) connected to the stirrer head (1), wherein the stirrer head (1) has stirrer blades (7) and a bearing assembly (8) and wherein the stirrer blades (7) are connected to the stirrer head magnets (6) and the bearing assembly (8), wherein the bearing assembly (8) rotatably supports the stirrer head (1) and the bearing assembly (8) comprises a first rotational bearing (9), wherein the bearing assembly (8) comprises a second rotational bearing (10), which is arranged spaced apart from the first rotational bearing (9) in the stirrer head (1).

8 Claims, 3 Drawing Sheets

(56) References Cited

U.S. PATENT DOCUMENTS

| | | | | |
|---|---|---|---|---|
| 5,470,152 | A * | 11/1995 | Rains | B01F 15/00435 |
| | | | | 366/273 |
| 5,758,965 | A * | 6/1998 | Gambrill | B01F 13/0845 |
| | | | | 366/273 |
| 5,779,359 | A * | 7/1998 | Gambrill | B01F 13/0827 |
| | | | | 366/273 |
| 6,065,865 | A * | 5/2000 | Eyraud | B01F 13/0872 |
| | | | | 366/273 |
| 6,206,562 | B1 * | 3/2001 | Eyraud | B01F 13/0827 |
| | | | | 366/273 |
| 6,854,877 | B2 * | 2/2005 | Hoobyar | B01F 13/0872 |
| | | | | 366/274 |
| 7,396,153 | B2 * | 7/2008 | Andersson | B01F 13/0827 |
| | | | | 366/273 |
| 8,123,199 | B2 * | 2/2012 | Terentiev | B01F 3/04248 |
| | | | | 261/93 |
| 8,128,277 | B2 * | 3/2012 | Meier | B01F 7/162 |
| | | | | 366/273 |
| 8,783,942 | B2 * | 7/2014 | Johansson | B01F 13/0827 |
| | | | | 366/274 |
| 9,565,970 | B2 * | 2/2017 | Alet Vidal | A47J 36/165 |
| 9,669,368 | B2 * | 6/2017 | Johansson | B01F 13/0827 |
| 9,833,757 | B2 * | 12/2017 | Johansson | B01F 13/0827 |
| 2005/0141342 | A1 * | 6/2005 | Hoobyar | B01F 13/0827 |
| | | | | 366/273 |
| 2006/0092761 | A1 * | 5/2006 | Terentiev | B01F 7/162 |
| | | | | 366/274 |
| 2007/0036027 | A1 * | 2/2007 | Meier | B01F 7/162 |
| | | | | 366/273 |
| 2017/0362555 | A1 * | 12/2017 | Damren | C12M 23/14 |
| 2018/0207593 | A1 * | 7/2018 | Zangl | B01F 13/0845 |
| 2019/0083948 | A1 * | 3/2019 | Poschl | B01F 13/0845 |

* cited by examiner

STIRRER FOR A STIRRER VESSEL

This application claims benefit of Serial No. A 50053/2017, filed 25 Jan. 2017 in Austria and which application is incorporated herein by reference. To the extent appropriate, a claim of priority is made to the above disclosed application.

BACKGROUND OF THE INVENTION

The invention relates to a stirrer for a stirrer vessel, which stirrer comprises a stirrer head, a drive unit and a magnetic coupling, wherein the magnetic coupling has drive magnets connected to the drive unit and stirrer head magnets connected to the stirrer head, wherein the stirrer head has stirrer blades and a bearing assembly, and wherein the stirrer blades are connected to the stirrer head magnets and the bearing assembly, wherein the bearing assembly rotatably supports the stirrer head and the bearing assembly comprises a first rotational bearing.

Stirrers for stirrer vessels are used, e.g., in the biopharmaceutical industry, the food industry and in particular in the field of aseptical liquid production processes. Typical configurations of such stirrer vessels are gas-tight and closable tank-like vessels made from metal or glass, which ensure simple cleaning and sterilization and, hence, multiple use. Mixing a stirring medium contained in the stirrer vessel is realized within the stirrer vessel by means of a stirrer head, which has stirrer blades and which is connected to a stirrer shaft having stirrer shaft blades arranged thereon, depending on the application and configuration of the stirrer vessel. In common stirrers, the connection of the drive unit with the stirrer head is realized via a sliding ring sealing. Stirrers sealed via sliding ring sealings, however, do have the disadvantage that leakage at the sealing may occur. Furthermore, maintenance of this type of sealing is work and cost intensive, wherein leaking in the case of correct maintenance is only minimal. In the pharmaceutical field and the food industry, however, this leakage and the contamination associated therewith of the stirring medium do constitute a high risk. For this reason, these industries have increasingly made use of stirrers having magnetic coupling, which are also termed magnetic stirrers, instead of stirrers having sliding ring sealings. Supporting the stirrer head of such stirrers is realized via a rotational bearing such as, e.g., a slide bearing.

EP 1 748 201 B1 discloses a stirrer having a magnetic coupling between drive unit and stirrer. It further comprises a rotational bearing in the form of a slide bearing, which is lubricated by the stirring medium within the vessel.

With such constructions it has proven to be disadvantageous that the rotational bearing limits the torque applied by the drive unit, the maximum rotational frequency, and the size of the stirrer blades as well as the length of the stirrer shaft. Improving these characteristics will lead to increased vibrations on the stirrer head and, as a consequence, to mechanical damage.

SUMMARY OF THE INVENTION

It is the task of the present invention to form a stirrer which avoids the disadvantages of the constructions mentioned above.

According to the invention, the present task is solved by the bearing assembly comprising a second rotational bearing, which is arranged spaced apart from the first rotational bearing within the stirrer head.

The embodiment of the stirrer according to the invention provides for a separated mounting of the stirrer head, whereby the advantages of a higher stability, load capacity and service life of the stirrer head in comparison to prior art will be obtained. This enables in particular further modifications of the remaining components of the stirrer, such as increased performance of the drive unit.

The embodiment of the stirrer according to the invention further offers the advantage that due to the increased load capacity of the bearing assembly the probability of bearing cracks will be reduced. These in general result in complex maintenance and repair works as well as idle times associated therewith. In addition, cracks in the bearing may lead to a contamination of the stirring medium, which is why the stirring medium cannot be further processed and has to be disposed of. Increased load capacity of the bearing assembly in particular has the advantage that there may be used longer stirrer shafts, which lead to increased vibrations of the stirrer shaft and, hence, to a higher stress on the bearing assembly of the stirrer head. This leads to the fact that the stirrer according to the invention may, in comparison to prior art stirrers, be used in larger stirrer vessels. Furthermore, in this way stirring media may be processed, which have a higher inhomogeneity compared to prior art.

It is especially advantageous that due to the higher drive performance available there may be obtained increased rotational speeds of the stirrer head, which is why improved mixing of the stirring medium is ensured. Furthermore, larger stirrer blades as well as larger stirrer shaft blades may be used. This also enables the use of stirrer vessels having a larger volume or the processing of stirring media having higher viscosity or higher inhomogeneity.

BRIEF DESCRIPTION OF THE DRAWINGS

Advantageous embodiments of the stirrer according to the invention as well as alternative embodiment variants will subsequently be explained by way of the figures.

DETAILED DESCRIPTION OF THE PREFERRED EMBODIMENTS

Figure 1:
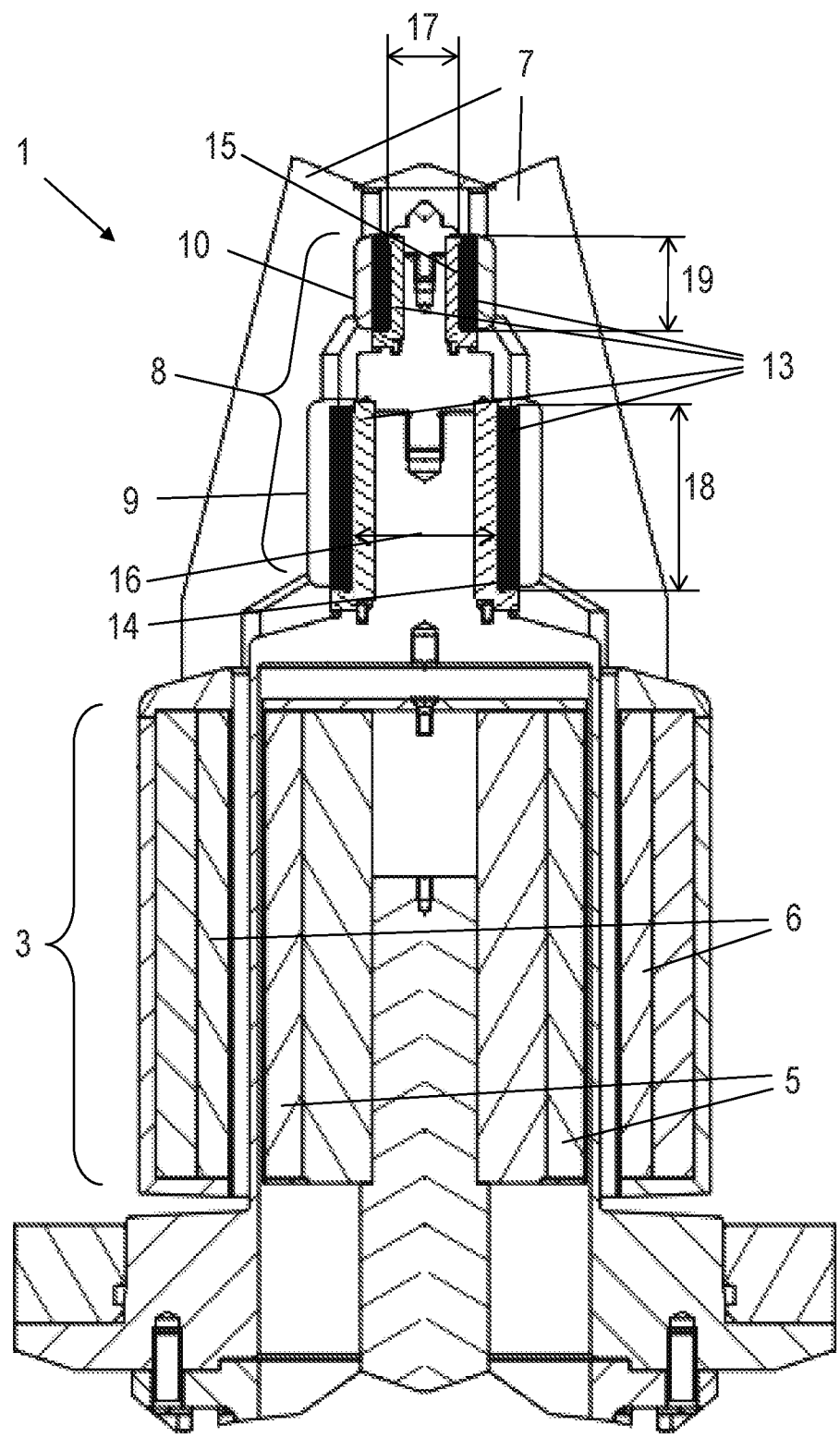
FIG. 1 shows a sectional view through a stirrer head of a stirrer according to the invention in a front view having a closed magnetic coupling.
Figure 3:
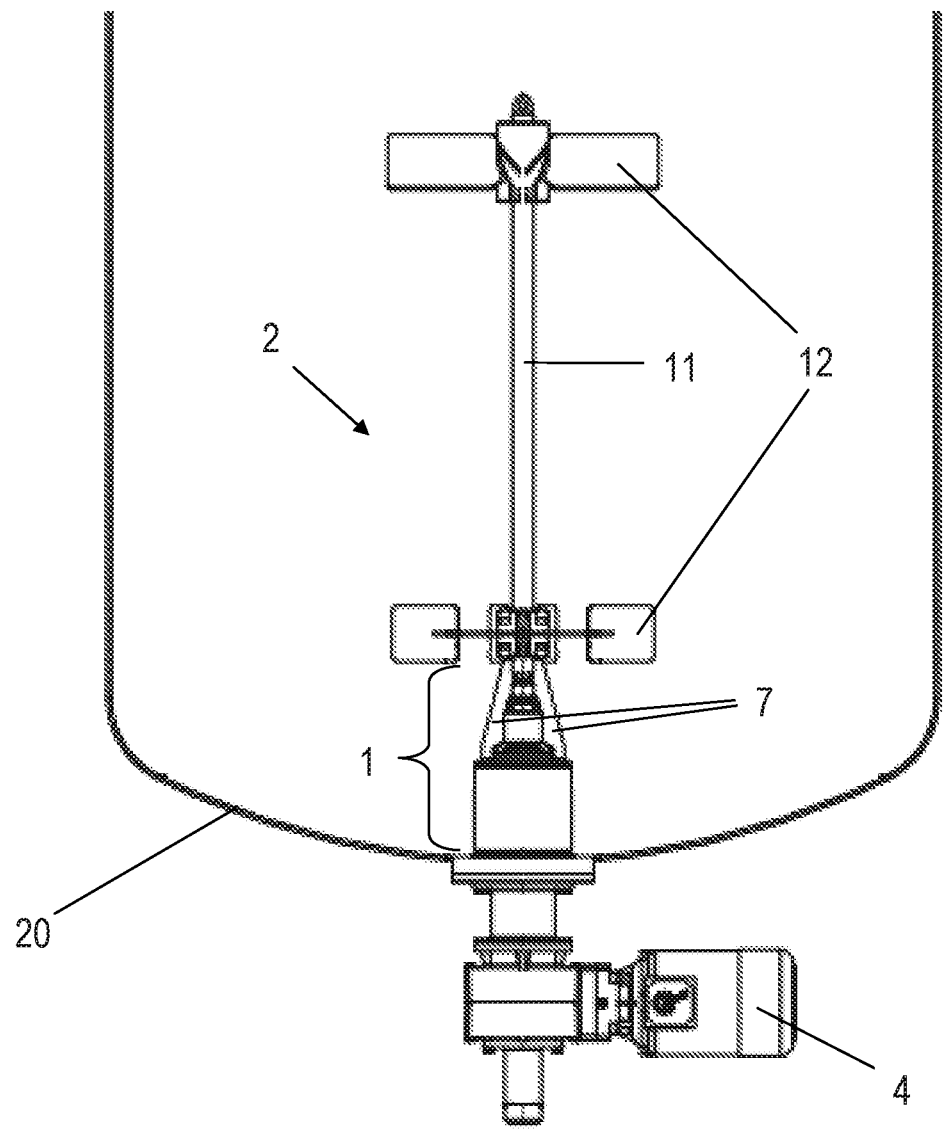
FIG. 3 shows a sectional view through a stirrer vessel having a stirrer according to the invention in a front view.

FIG. 1 shows a preferred embodiment of a stirrer head 1 of a stirrer 2 according to the invention, which is in a complete state depicted in FIG. 3, having a closed magnetic coupling 3. The stirrer 2 comprises the stirrer head 1, a drive unit 4, which is depicted in FIG. 3, as well as the magnetic coupling 3. The magnetic coupling 3 includes drive magnets 5 and stirrer head magnets 6, wherein the stirrer head magnets 6 are rigidly connected to the stirrer head 1. The drive magnets 5, in turn, are connected to the drive unit 4. In operation, the drive unit 4 drives the drive magnets 5, which are magnetically coupled with the stirrer head magnets 6, into rotation. In this way, a rotational motion of the drive magnets 5 is transferred to the stirrer head magnets 6 and the stirrer head 1 is set into rotation in order to mix a stirring medium.

The stirrer head 1 further comprises stirrer blades 7 as well as a bearing assembly 8. The bearing assembly 8 is composed of a first rotational bearing 9 and a second rotational bearing 10, which are arranged spaced apart from each other within the stirrer head 1. The stirrer blades 7 provide for a rigid connection of the stirrer head magnets 6 with the first rotational bearing 9 and the second rotational bearing 10. The separated configuration of the bearing assembly 8 via the first rotational bearing 9 and the second rotational bearing 10 offers the advantage that strains, which are absorbed by the bearing assembly 8, will be distributed. This has the advantage that in this way there is obtained a higher stability, load capacity and longer service life of the bearing assembly 8 in comparison to prior art. In the preferred embodiment that is depicted in FIG. 1, the first rotational bearing 9 is situated nearer to the magnetic coupling 3 than the second rotational bearing 10.

The stirrer head 1 in addition provides for the accommodation of a stirrer shaft 11 depicted in FIG. 3 having stirrer shaft blades 12 arranged thereon within the end of the stirrer head 1 opposite to the magnetic coupling 3.

The first rotational bearing 9 and the second rotational bearing 10 are embodied as slide bearings having sliding surfaces 13 in the preferred embodiment. The first rotational bearing 9 and the second rotational bearing 10 are thereby lubricated by the stirring medium, which is mixed by the stirrer 2. This embodiment has the advantage of an especially simple and resistant set-up of the stirrer head 1, having a smaller number of moving parts. This configuration further facilitates disassembly of the stirrer head 1 from the stirrer 2. Especially preferred is the configuration of the sliding surfaces 13 from ceramic materials, metallic materials or polymer compounds such as PEEK or any combinations of these materials, respectively. The sliding surfaces 13 may in addition have a coating, such as, e.g., a diamond coating. This offers the advantage of especially low wear. In alternative embodiments, there may be used other configurations for the rotational bearings 9 and 10, such as, e.g., ball bearings or roller bearings. Further configurations for the rotational bearings 9 and 10 are obvious for those skilled in the art from the exemplary reference given.

In-between the sliding surfaces 13 of the first rotational bearing 9, there is located a first bearing gap 14, and in-between the sliding surfaces 13 of the second rotational bearing 10, there is located a second bearing gap 15. These bearing gaps 14 and 15, due to the set-up of rotational bearings, have a circular cross-section, which has a first bearing gap diameter 16 for the first rotational bearing 9 and a second bearing gap diameter 17 for the second rotational bearing 10.

The first rotational bearing 9 further has a first width 18, and the second rotational bearing 10 has a second width 19, which represent the dimensions of the rotational bearings 9 and 10 perpendicularly to the bearing gap diameters 16 and 17.

In the preferred embodiment of the stirrer head 1, that is depicted in FIG. 1, the first bearing gap diameter 16 is different from the second bearing gap diameter 17, and the first width 18 is different from the second width 19. This leads to the advantage that vibrations developing at the stirrer head 1 will be absorbed by the second rotational bearing 10 and will be transferred to the first rotational bearing 9 via the stirrer head blades 7 only in a dampened form. In addition, this leads to a load distribution within the bearing assembly 8, which suppresses undesired oscillation of the stirrer head 1.

Particularly in the preferred embodiment depicted in FIG. 1, the first width 18 and the first bearing gap diameter 16 are larger than the second width 19 and the second bearing gap diameter 17. In this way, there is ensured that in the case of stress on the bearing assembly 8 the probability of bearing cracks of the second rotational bearing 10 is higher than the probability of bearing cracks in the first rotational bearing 9. This is advantageous as the second rotational bearing 10 has smaller dimensions that the first rotational bearing 9, which is why the replacement thereof is cheaper.

The stirrer head 1 depicted in FIG. 1 enables, as already mentioned, the accommodation of the stirrer shaft 11 depicted in FIG. 3 having the stirrer shaft blades 12 arranged thereon within the end of the stirrer head 1 opposite to the magnetic coupling 3. The ratios mentioned above of the first width 18 and the second width 19 as well as the first bearing gap diameter 16 and the second bearing gap diameters 17 are in particular advantageous for the use of longer stirrer shafts 11, at which stronger vibrations may occur, in order to suppress undesired oscillation of the stirrer head 1.

In the preferred embodiment of the stirrer 2, the first rotational bearing 9 is connected to the second rotational bearing 10 exclusively via the stirrer blades 7. This offers the advantage of an especially stabile connection with simultaneously low material costs and a dampened vibration transfer between the rotational bearings 9 and 10.

Figure 2:
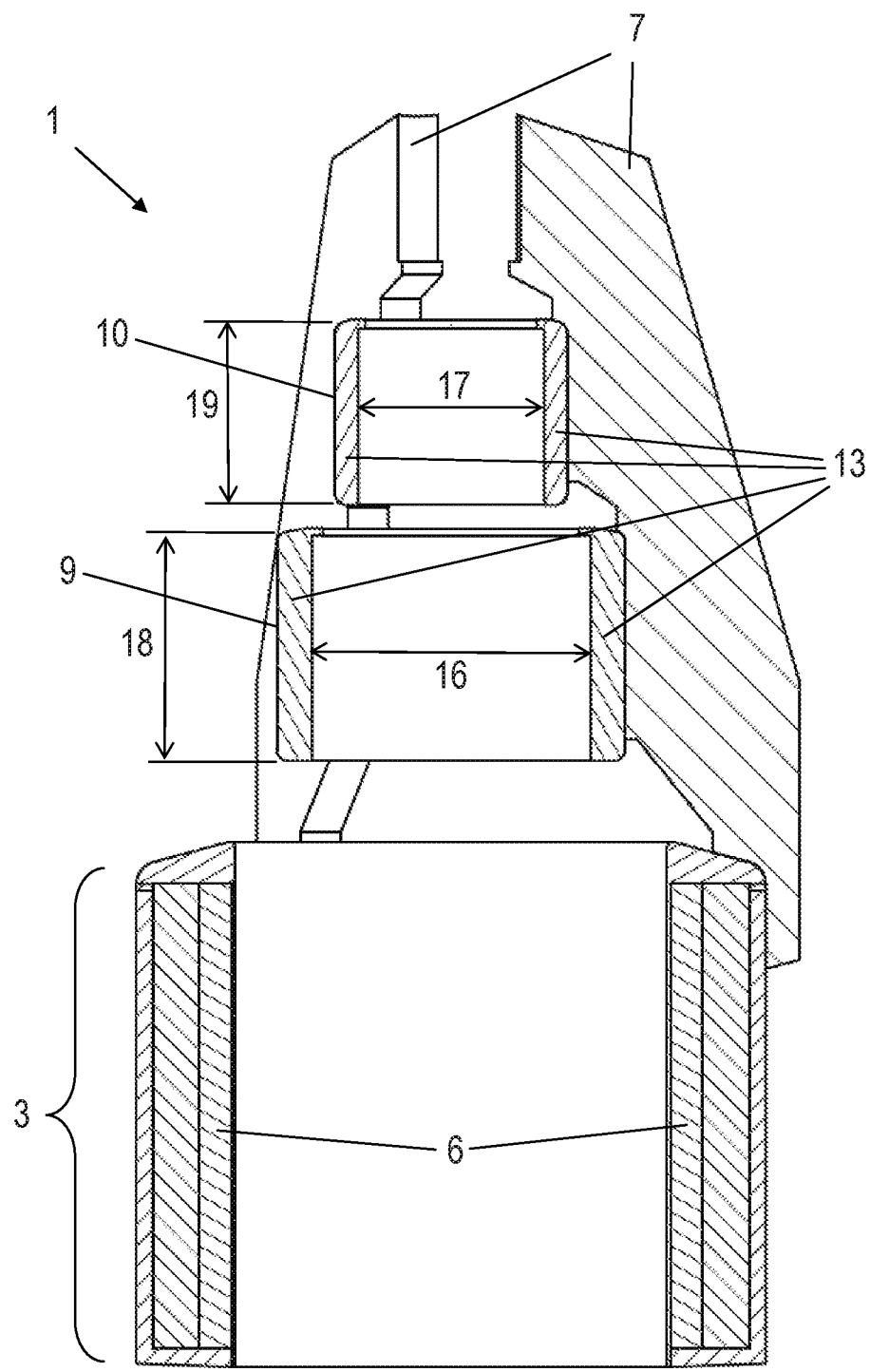
FIG. 2 shows a sectional view through the stirrer head of FIG. 1 in a disassembled state in a front view.

FIG. 2 shows the stirrer head 1 according to FIG. 1 in a state disassembled from the stirrer 2. For this purpose, the magnetic coupling 3 has been opened, wherein the drive magnets 5 have been separated from the stirrer head magnets 6. The sliding surfaces 13 of the first rotational bearing 9 and of the second rotational bearings 10 have further been separated.

FIG. 3 shows the stirrer 2 according to the invention installed in a stirrer vessel 20. In the preferred embodiment of the stirrer vessel 20 depicted, the stirrer 2 is installed on a vessel bottom of the stirrer vessel 20. In an alternative embodiment, the stirrer 2 is installed on a vessel cover of the stirrer vessel 20, which vessel cover may also be configured detachably. The drive unit 4 is situated outside of the stirrer vessel 20. The stirrer vessel 20 may be filled with the stirring medium, which may then by mixed by way of the rotational motion of the stirrer head 1. The stirrer 2 in FIG. 3 further comprises the stirrer shaft 11, at which there are arranged the stirrer shaft blades 12. The stirrer shaft 11 is rigidly connected to the stirrer head 1, offering the advantage that by means of the stirrer shaft blade 12 there may be ensured a homogenous mixing of the stirring medium within the entire stirrer vessel 20. The embodiment of the stirrer 2 according to the invention advantageously enables the use of differently configured stirrer blades 7 as well as stirrer shafts 11 having different lengths. In this way, it is made possible to install the stirrer 2 according to the invention in a variety of different forms of stirrer vessels 20, and, as depicted in FIG. 3, in the vessel bottom of the stirrer vessel 20, as well as in the vessel cover thereof, which is not depicted in FIG. 3. This has the advantage that the stirrer 2 according to the invention may be used in a variety of different stirrer vessels 20.

The invention claimed is:

1. A stirrer for a stirrer vessel, which stirrer comprises a stirrer head, a drive unit and a magnetic coupling,
   wherein the magnetic coupling has drive magnets connected to the drive unit and stirrer head magnets connected to the stirrer head,
   wherein the stirrer head has stirrer blades and a bearing assembly, and wherein the stirrer blades are connected to the stirrer head magnets and the bearing assembly,
   wherein the bearing assembly rotatably supports the stirrer head and the bearing assembly comprises a first rotational bearing, wherein the bearing assembly comprises a second rotational bearing, which is arranged spaced apart from the first rotational bearing in the stirrer head, and wherein the first rotational bearing is connected to the second rotational bearing exclusively via the stirrer blades.

2. A stirrer according to claim 1, wherein
the first rotational bearing has a first bearing gap diameter and the second rotational bearing has a second bearing gap diameter, which is different from the first bearing gap diameter.

3. A stirrer according to claim 2, wherein the first bearing gap diameter is larger than the second bearing gap diameter and that the first width is larger than the second width.

4. A stirrer according to claim 1, wherein the first rotational bearing has a first width and the second rotational bearing has a second width, which is different from the first width.

5. A stirrer according to claim 1, wherein the stirrer comprises a stirrer shaft having stirrer shaft blades, which are connected to the stirrer head.

6. A stirrer according to claim 1, wherein the first rotational bearing and the second rotational bearing are configured as sliding bearings.

7. A stirrer according to claim 6, wherein the first rotational bearing and the second rotational bearing contain sliding surfaces made from at least one material of the group consisting of ceramic materials, metallic materials and polymer compounds, wherein the sliding surfaces may have a coating.

8. A stirrer vessel for stirring a stirring medium, comprising a stirrer according to claim 1, which is arranged in a vessel bottom or in a detachable vessel cover of the stirrer vessel.

* * * * *